United States Patent [19]

Stellato

[11] Patent Number: 4,901,989

[45] Date of Patent: Feb. 20, 1990

[54] APPLIANCE REPAIR TILT STAND AND METHOD OF SUPPORTING AN APPLIANCE IN FORWARDLY TILTED CONDITION FOR SERVICING

[76] Inventor: Richard J. Stellato, 12425 S.E. River Rd. #2, Milwaukee, Oreg. 97222

[21] Appl. No.: 274,291

[22] Filed: Nov. 21, 1988

[51] Int. Cl.⁴ .............. B23Q 3/00

[52] U.S. Cl. .............. 269/17; 269/79; 269/901; 269/296

[58] Field of Search .............. 29/559; 269/79, 296, 269/901, 17; 254/94; 248/447, 457, 455, 456, 462, 133, 351, 166

[56] References Cited

U.S. PATENT DOCUMENTS

| | | | |
|---|---|---|---|
| 2,738,501 | 3/1956 | Swanson | 269/296 |
| 3,022,995 | 2/1962 | Sorenson et al. | 269/296 |
| 3,047,286 | 7/1962 | Kinne | 269/79 |
| 3,347,543 | 10/1967 | Zak | 269/296 |
| 3,761,058 | 9/1973 | Stone et al. | 254/94 |
| 4,466,601 | 8/1984 | Raines | 269/79 |
| 4,674,731 | 6/1987 | Stellato | 29/559 |
| 4,792,130 | 12/1988 | Ardent | 269/296 |

*Primary Examiner*—Robert C. Watson

*Attorney, Agent, or Firm*—Olson & Olson

[57] ABSTRACT

An appliance tilt stand for releasably supporting a washing machine or other appliance in a forwardly tilted, secure position during servicing, comprises a base configured to be disposed on a floor surface and slid underneath an appliance from the front of the appliance to a point determined by the abutment of a stop member mounted on the stand base with the inside lower front frame of the appliance. The base also mounts, a spaced distance rearwardly of the stop member, an elongated, telescoping pivotal support arm mounting a pad member arranged to engage and support the front wall of an appliance tilted forwardly thereagainst, the arm also mounting an appliance-engaging arm configured to engage the top frame of an appliance and positively and securely lock the appliance in tilted position on the stand. Rollers are preferably also included on the base of the stand to permit the appliance repair tilt stand to serve also as an appliance dolly during servicing.

6 Claims, 3 Drawing Sheets

APPLIANCE REPAIR TILT STAND AND METHOD OF SUPPORTING AN APPLIANCE IN FORWARDLY TILTED CONDITION FOR SERVICING

BACKGROUND OF THE ART

This invention relates to servicing support stands arranged to engage an appliance and support it in a forwardly tilted position, and more particularly to an improvement over my earlier appliance repair tilt stand U.S. Pat. No. 4,674,731, issued 23 June 1987.

My earlier patent, identified above, is believed to illustrate the most pertinent art relating to the present invention.

I have discovered that the tilt stand of my earlier invention, although very effective and reliable, posed certain incumberences to a repairman working on a supported appliance in that the construction of the stand requires its attachment to the rear of the machine, thus obstructing and interfering with free and unhindered access to the rear and bottom of the machine being repaired. Since virtually all of the operational mechanism of these appliances is usually accessed through the rear and bottom walls of washing machines, etc., the obstructing support stand sometimes posed a block to the repairman's access and view.

SUMMARY OF THE INVENTION

In its basic concept, this invention provides an improved appliance repair tilt stand which engages an appliance to be repaired from its front and supports it in a forwardly tilted, secure position during servicing.

It is by virtue of the foregoing basic concept that the principal objective of this invention is achieved; namely, the provision of an appliance repair tilt stand which supports an appliance in a secure, forwardly tilted condition while posing no hinderence to the accessibility of the rear and bottom of the applicance when in a tilted position, thereby overcoming the disadvantages and limitations of my earlier patented repair stand.

Another objective of this invention is the provision of an appliance repair tilt stand of the class described which also facilitates movement of the appliance about a floor surface.

Another objective of this invention is the provision of an appliance repair tilt stand of the class described which is configured to be usable on a variety of different, heavy appliances.

Another object of this invention is the provision of an appliance repair tilt stand of the class described which is of simplified construction for economical manufacture.

The foregoing and other objects and advantages of this invention will appear from the following detailed description, taken in connection with the accompanying drawings of a preferred embodiment.

DESCRIPTION OF THE PREFERRED EMBODIMENT

Figure 1:
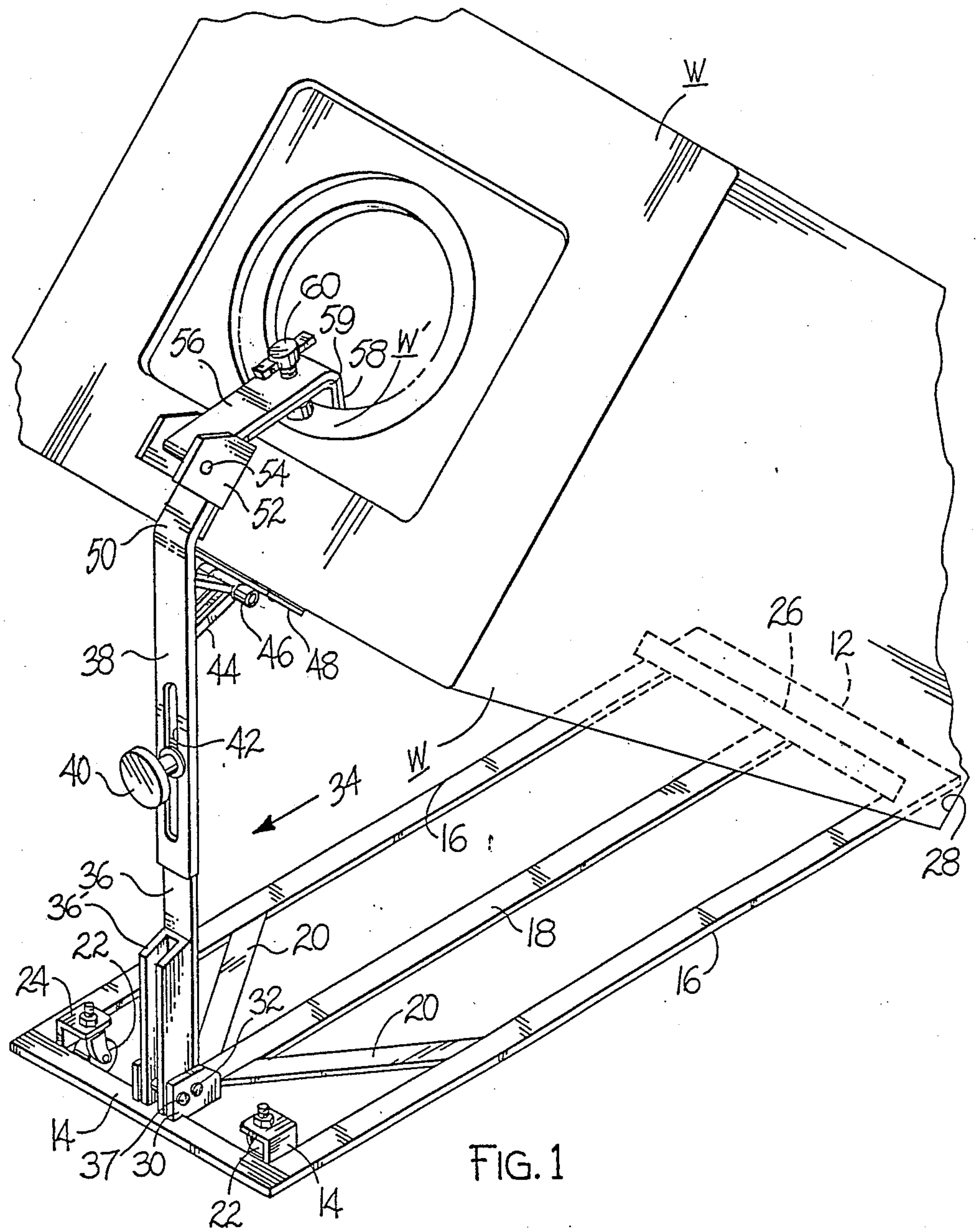
FIG. 1 is a fragmentary perspective view of an appliance repair tilt stand embodying the features of this invention shown in operative condition supporting a conventional top loading washing machine in tilted condition for servicing.
Figure 2:
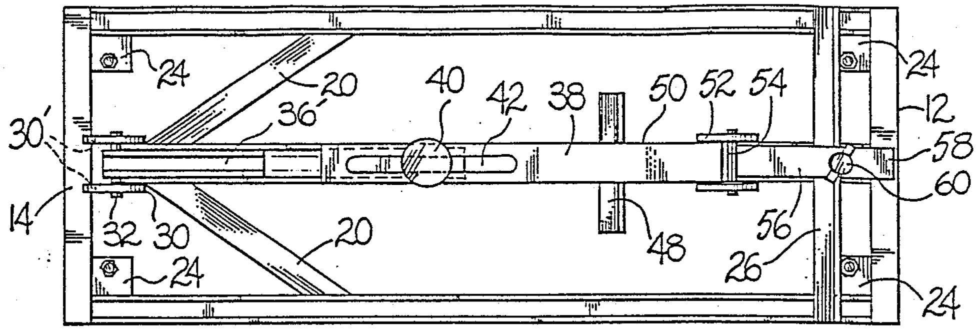
FIG. 2 is a plan view of the repair stand of FIG. 1 shown in collapsed, storage condition.
Figure 3:
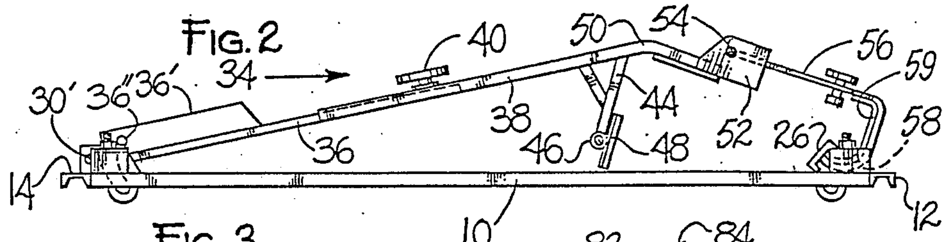
FIG. 3 is a side elevation of the stand of FIG. 2 taken along the line 3—3 in FIG. 2.
Figure 4:
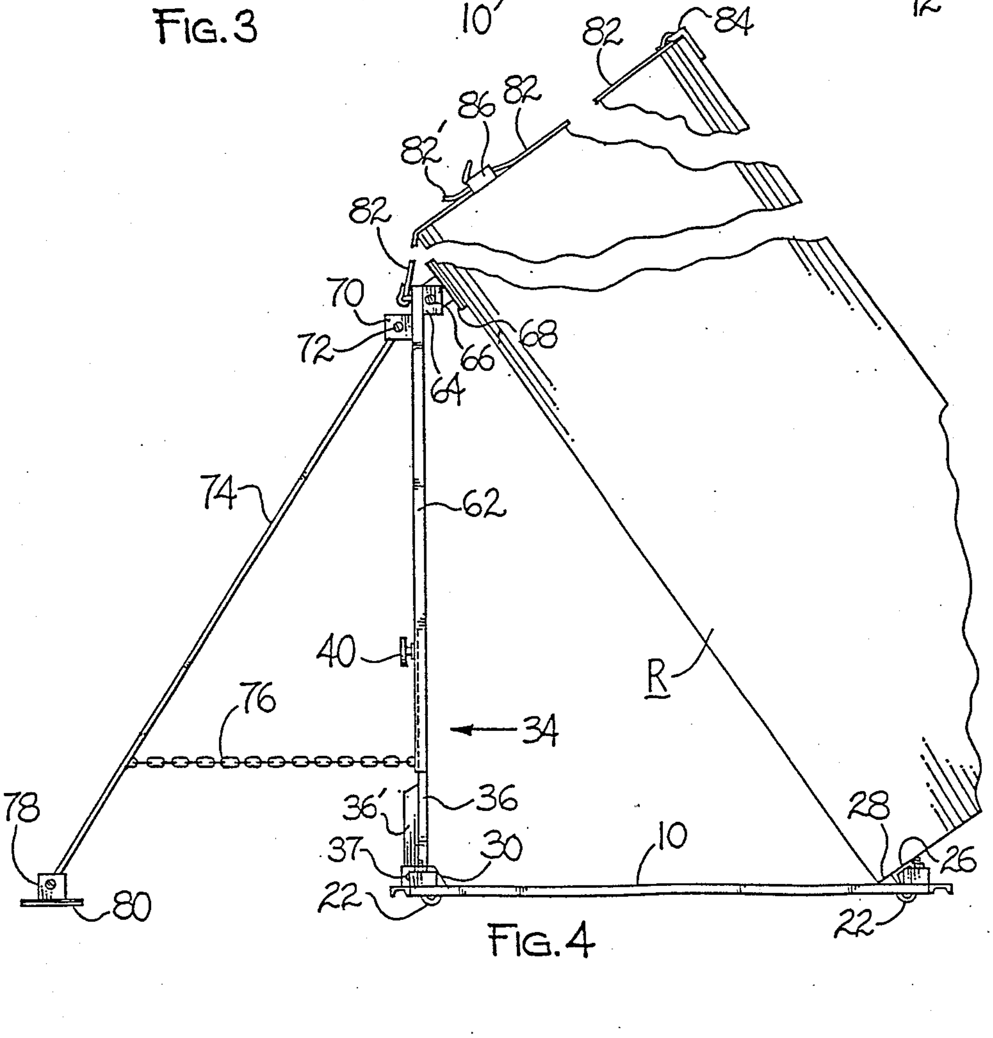
FIG. 4 is a fragmentary, foreshortened, side elevation of the stand of FIG. 1 mounting a substitute, alternative appliance support arm and securing arrangement configured to engage and support appliances other than the top loading washing machine shown in FIG. 1, the view showing a refrigerator being supported for purposes of illustration.
Figure 5:
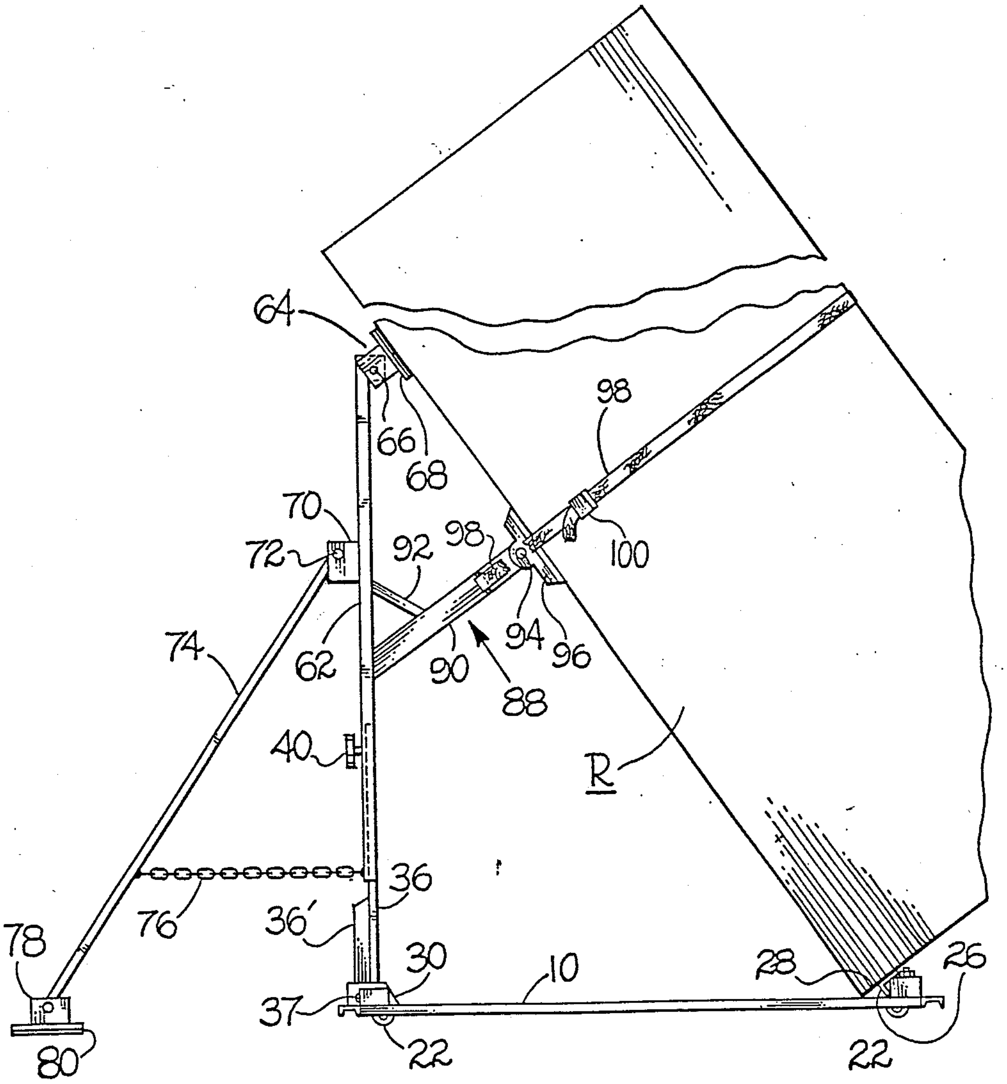
FIG. 5 is a fragmentary, foreshortened side elevation of the tilt stand of FIG. 1 mounting a substitute, preferred heavy appliance support arm and securing arrangement configured to engage and support an upright refrigerator or freezer.

An appliance servicing tilt support stand embodying the features of this invention is illustrated in the drawings, and provides a significant improvement over the construction of the appliance repair tilt stand of my earlier invention, disclosed in U.S. Pat. No. 4,674,731. FIGS. 1-3 illustrate the tilt stand of this invention mounting one appliance support arm and attachment means configured specifically to engage a conventional top loading washing machine W and hold it in a forwardly tilted, securely supported condition. FIG. 4 illustrates the tilt stand of FIG. 1 but mounting a second, substitute support arm and connector means configured to engage and support other non-top door opening appliances such as a front loading washing machine, a dryer, or the refrigerator R that is shown in the drawing. FIG. 5 illustrates the tilt stand of FIG. 4 but mounting a third, preferred support arm and connector means configured to engage heavy and bulky appliances such as a refrigerator or freezer in a preferred manner for stability and security. As will be understood, the stand of this invention is arranged, like its predecessor, to support an appliance in a position of forward tilt approximating 45 degrees relative to normal. This approximate position of tilt has been found by the industry to be advantageous for machine repair for various known reasons.

The appliance repair tilt stand of this invention comprises an elongated base, identified herein generally as base 10, which may as shown be formed of a plurality of channel shaped frame members arranged to provide a strengthened platform having a front end 12, rear end 14, lateral sides 16, and center beam 18 that may, if desired, be reinforced as shown by angle braces 20. The base is configured to be supported on a floor surface, and preferably mounts roller means, illustrated as pivotal casters 22 of the type capable of supporting heavy loads. Mounting bracket means 24 on the base each mount a caster at each of the corners of the base, and the brackets and casters are preferably configured to support the base rollably on a floor surface spaced thereabove as close as practical to clear minor surface variations such as carpeting, thresholds, etc.

As shown, the base mounts, preferably a spaced distance rearwardly of its forward end 12, an appliance stop member 26 configured, as illustrated in FIGS. 1 and 4, to engage the rearward side surface of the strengthened lower front frame member 28 of an appliance. As will be explained in closer detail later, an appliance is tilted slightly rearwardly in order to raise its front bottom edge off of a floor surface a distance sufficient to allow the tilt stand base 10 and associated upwardly projecting stop bar 26 to be slid underneath the machine just far enough for the step member to be disposed rearwardly of and adjacent to the front bottom frame rails of the appliance. When properly positioned, the stop member 26 abuts the rearward surface of the lower appliance frame 28, and thus completely prevents movement of the appliance forwardly on the tilt stand base 10.

The opposite, rear end 14 of the base mounts, preferably slightly forwardly of the rear terminal end, a support bar pivot mount 30. This mount provides support for pivot pin 32 by which an elongated appliance support arm 34 is attached pivotally to the base for arcuate movement above the base.

The elongated, pivotal support bar is configured, in this embodiment, as two telescoping sections, 36, 38 connected slidably together by clamp means illustrated herein as clamp bolt 40 threadably attached to arm section 36 through a slot 42 provided in arm section 38. As will be understood, when the clamp bolt 40 is tightened, it frictionally locks the extensible arm member 38 in a desired position of longitudinal adjustment on the lower arm member 36. Loosening the clamp bolt 40 permits the extensible arm member 38 to be telescoped longitudinally. By unscrewing the clamp bolt 40 completely, the upper, extensible arm section 38 can be removed completely from the lower arm section 36, for purposes which will be explained later.

As illustrated, the lower arm section 36 preferably includes a support bracket 36' extending to its lower terminal end, the bracket including a bore 36" provided therethrough for alignment with another bore 30', provided in the support bar pivot mount 30 on the base, when the arm section 36 is positioned in a desired, upstanding condition for supporting an appliance, as will be explained later. A locking pin 37 is provided to removably intercept the aligned bores 30', 36" for releasably securing the arm 34 in unassisted, desired upstanding position, and prevents undesirable pivoting of the arm before and during engagement of the arm with an appliance, as will become clear later.

Referring again to the upper, extensible arm section 38, means is provided to engage the front wall of an appliance and support the appliance while it is leaning thereagainst. In this regard, a bracket 44 is mounted on the support arm section 38, the bracket configured to extend from the arm forwardly relative to the base, and preferably mounts as illustrated at its outer terminal end a pivot 46 which in turn mounts an appliance support pad 48 configured to engage the outer surface of the front wall of an appliance tilted thereagainst. The pad 48 is preferably configured of resilient material of a type which will not scuff, scratch or otherwise mar or damage the appliance finish. Its pivotal mount on the support arm assures full contact of the pad with the surface of the appliance.

As illustrated, the extensible support arm section 38 of this embodiment is configured with a forwardly oriented bend 50 provided a spaced distance above the bracket 44 and just inwardly of the terminal end of the arm section. This bend is provided to more suitably orient appliance connector means which are provided to positively secure an appliance on the repair tilt stand of this invention. As illustrated, the outer terminal end of the extensible arm section 38 mounts a pivot mount 52 which provides support for pivot pin 54 by which an elongated appliance securing arm 56 is attached pivotally to the support arm section 38 for arcuate movement relative thereto. As shown best in FIGS. 1 and 3, the member 56 is configured substantially to include an outer hook portion 58, and the member is dimensioned such that the hook portion 58 can extend into the well of a conventional top loading washing machine and engage the lower side of the peripheral wall W' of the washer frame surrounding that opening. The surfaces of the arm 56 and the hook 58 which come into contact with the appliance surface also preferably mount, as shown, a non-scuff padding material 59 to prevent scratching or marring of the appliance finish. A clamp bolt 60 is provided on the arm 56 and arranged so that, when the hook engages the frame lip of the washer opening, the clamp 60 may be screwed downwardly and thereby securely capture the washing machine frame W' immovably between it and the hook. In this manner, the washing machine is rigidly and positively engaged by the support arm structure.

From the foregoing, the attachment of the appliance repair tilt stand embodied in FIGS. 1–3 to a top loading washing machine to be serviced is easily understood: First, the appliance repair tilt stand is positioned in front of a washing machine W, the forward edge 12 of the base being positioned adjacent the front lower edge 28 of the machine to be serviced. The washing machine is tilted slightly rearwardly in order to elevate its front lower edge 28 off of the floor so that the base 12 and stop 26 of the tilt stand may be slid a short distance beneath the machine. The machine is then lowered, and the tilt stand may then be pulled back outwardly until the stop member 26 comes into abutment with the rearward side surface of the front frame rail 28 of the appliance. With the support arm structure 34 being held, by locking pin 37, approximately perpendicularly to the plane of the base, the appliance is then tilted forwardly so that its lower front edge rests on the tilt stand base and the upper portions of the front wall of the washing machine come to rest upon the support pad 48. The arm section 38 may be telescopically adjusted as desired to establish the degree of appliance tilt that is desirable to the repairman, and which maintains the appliance in an over-center position of gravity in which the weight of the appliance bears on the support pad 48. The appliance engaging hook arm 56, 58 is pivoted so that the hook enters the well of the washing machine and engages the underside of the frame surrounding the tub opening of the machine, and the clamp bolt 60 is tightened down onto the upper surface of the tub frame opening, thereby positively securing the washing machine in fixed position and thus eliminating the possibly of inadvertent disengagement of the washing machine. With the machine thus engaged and supported, the machine is extremely stable and secure on the repair tilt stand, and, by virtue of the rollers 22 on the base of the stand, the stand also provides a dolly by which the heavy appliance may be easily moved about a floor surface.

Since the tilt stand egages only the front and the top of the washing machine, access to the internal mechanism of the washing machine through the back wall and the bottom of the washing machine is completely unhindered. When repair is complete, the machine is dollied back into its desired location, and the aforementioned attachment procedure is reversed.

Referring now to FIG. 4 of the drawings, there is shown a second configuration of the upper, extensible arm member and appliance securing means described hereinbefore. The modified upper support arm 62 is provided to replace the arm 38 when the tilt stand is used to support appliances other than conventional top loading washing machines. As mentioned earlier, the arm 38 is removed simply by unscrewing the clamp bolt 40 completely, and removing the arm 38 from contact with the lower support arm 36. The replacement support arm 62 is installed on arm 36 in the reverse manner that the arm 38 was removed therefrom. The arm 62 is configured to be telescopically adjustable on arm 36 as was described earlier in connection with arm member 38.

The support arm 62 includes a pivot support 64 mounting by pivot 66 a support pad 68 similar in configuration and function to the assembly 44, 46, 48 described earlier.

For purposes of illustration, the support arm structure shown in FIG. 4 includes an additional brace arrangement which would be advisable in instances where the appliance repair tilt stand is used with unusually heavy or cumbersome appliances such as refrigerators, freezers or the like. A pivot mount 70 is provided on the arm 62 adjacent the pad 64, and includes a pivot pin 72 which preferably releasably mounts a brace leg 74 which is arranged to be supported on the floor surface to give additional, positive support to the arm assembly 34. Means would typically be provided to prevent inadvertent, excessive outward movement of the brace leg 74, and for this purpose chain 76 is provided. Typically, a pivotal flooding 78 would be provided on the leg 74, the footing including a non-skid, non-scuff pad 80.

Means is provided to positively secure the appliance, a refrigerator R being illustrated herein, in tilted condition on the repair tilt stand and resting against the pad 68. In this embodiment, an adjustable cinch strap 82 is anchored to the arm 62 and is configured with sufficient length so as to extend from the arm 62 upwardly and over the top of the appliance and to extend at least to its rear upper corner. The terminal end of the strap 82 mounts a conventional L bracket configured to engage a corner edge. These arrangements are known in the art.

An appliance is engaged, tilted and supported by the repair tilt stand in the same manner as has been described earlier. The securing of an appliance securely to the repair tilt stand, once the appliance is in proper tilted and supported condition is simply accomplished by drawing the strap 82 upwardly and over the top of the appliance, engaging the corner bracket 84 positively against the back corner edge of the appliance and cinching the strap 82 down into tightened condition by pulling on the free end 82' of the strap 82 and locking it in tightened condition by conventional means such as the conventional friction lock 86 illustrated. The appliance is thus securely and positively held tightly in tilted condition against the pad 68.

FIG. 5 shows a preferred substitute upper arm structure for supporting refrigerators, freezers and the like. In this embodiment, the upper arm section 62 additionally mounts a second appliance support structure illustrated generally herein as 88, configured to provide additional support of a tall appliance. The support structure 88 includes a projecting post 90 which is preferably supported by a brace 92, the post 90 mounting, as by conventional pivot pin 94 shown, a support pad 96 similar in construction and function to appliance support pad 68 shown, (and also described in connection with FIG. 4). Both of these pads 68, 96 include non-slip, non-scuff material to prevent marring and other abrasions to the appliance surface, and are both dimensioned to provide a firm and secure contact with the appliance while also engaging enough surface area to prevent denting or bending of the wall or door surfaces from the weight of the appliance leaning thereagainst. In this embodiment, the appliance securing means, strap 98, is fastened at one of its ends to the post 90 on the upper arm 62, drawn around the appliance, and secured in tightened condition by buckle 100. The use and operation of the tilt stand of FIG. 5 is similar to that previously described in connection with FIG. 4.

From the foregoing it will be apparent to those skilled in the art that various changes other than those already described may be made in the size, shape, type, number and arrangement of parts described hereinbefore without departing from the spirit of this invention and the scope of the appended claims. For example, although the cinch strap arrangement is shown herein as cooperating with a refrigerator for illustrative purposes, it will be understood that it is equally usable in other typical appliances such as front loading washers, dryers, and, for that matter, even top loading washers as well.

Having thus described my invention and the manner in which it may be used, I claim:

1. An appliance repair tilt stand for use in supporting an appliance to be serviced, the tilt stand comprising:

(a) an elongated base configured for operational disposition on a ground surface, the base having one longitudinal end arranged to be slid under an appliance to be serviced from the front of the latter, (b) an appliance stop member mounted on the base adjacent the said one end, the stop member arranged to abut a front lower frame of an appliance positioned over the base, (c) elongated support arm means pivotally connected at one of its ends to the base adjacent the end opposite said one end, (d) appliance support means on the elongated support arm means, the appliance support means configured to engage and support the outer front wall of an appliance positioned on the base and tilted forwardly against the appliance support means, and (e) appliance engaging means on the elongated support arm means, the appliance engaging means configured to securely engage the appliance and positively hold the appliance on the stand with its front wall supported by said appliance support means.

2. The appliance repair tilt stand of claim 1 wherein said appliance engaging means on the support arm comprise a length of strap material secured at one of its ends to the elongated support arm and is configured to extend therefrom to an appliance where the strap is secured, and includes tightening means whereby the strap may be cinched down and releasably secured in said cinched condition, firmly securing a tilted appliance positioned on the stand immovably against said appliance support means.

3. The appliance repair tilt stand of claim 1 wherein said appliance support means includes at least one pad of material configured to prevent scratching, marring and other damage to the finish of an appliance front wall supported thereby.

4. The appliance repair tilt stand of claim 1 wherein an appliance is a top loading washing machine and said appliance engaging means comprise a pivotal member attached to said support arm, the pivot member configured to overlie the top of a top loading washing machine having a top opening and releasably but positively engage the appliance frame at the top opening thereof to secure a titlted washing machine appliance positioned on the stand immovably against said appliance support means.

5. The appliance repair tilt stand of claim 4 wherein said pivotal member includes a hook member configured to enter the top opening of a top loading washer and engage the peripheral frame surrounding the opening, and clamp means on the pivotal member is provided to engage the top of the appliance and releasably secure the hook in engagement with said frame surrounding the top opening of the appliance.

6. The appliance repair tilt stand of claim 5 including roller means on the base for supporting the stand and an appliance being supported rollably on a floor surface.

* * * * *